(12) United States Patent
Lin et al.

(10) Patent No.: US 7,961,577 B2
(45) Date of Patent: Jun. 14, 2011

(54) SYSTEM AND METHOD FOR GENERATING AN OUTPUT SIGNAL INDICATING A SPECIFIC AREA ON AN OPTICAL DISC UTILIZING AN ADJUSTABLE SPECIFIC TIME

(75) Inventors: Meng-Hsueh Lin, Taipei County (TW); Shu-Hung Chou, Taipei County (TW); Shu-Ching Chen, Tao-Yuan Hsien (TW)

(73) Assignee: MediaTek Inc., Science-Based Industrial Park, Hsin-Chu Hsien (TW)

( * ) Notice: Subject to any disclaimer, the term of this patent is extended or adjusted under 35 U.S.C. 154(b) by 1247 days.

(21) Appl. No.: 11/308,179

(22) Filed: Mar. 10, 2006

(65) Prior Publication Data
US 2007/0211611 A1    Sep. 13, 2007

(51) Int. Cl.
*G11B 7/00* (2006.01)
(52) U.S. Cl. .............. 369/53.29; 369/53.11; 369/53.22; 369/47.22
(58) Field of Classification Search .............. 369/47.22, 369/53.29
See application file for complete search history.

(56) References Cited

U.S. PATENT DOCUMENTS

| | | | |
|---|---|---|---|
| 4,663,751 A | 5/1987 | Kaku et al. | |
| 4,695,993 A | 9/1987 | Takagi et al. | |
| 5,523,990 A * | 6/1996 | Chiba ................ | 369/47.22 |
| 5,623,468 A * | 4/1997 | Takeda et al. ............. | 369/47.21 |
| 5,822,263 A | 10/1998 | Campbell | |
| 5,848,050 A | 12/1998 | Nagasawa | |
| 5,867,474 A | 2/1999 | Nagasawa | |
| 6,055,218 A | 4/2000 | Takeda | |
| 6,055,219 A | 4/2000 | Ho | |
| 6,088,307 A | 7/2000 | Fushimi | |
| 6,091,678 A | 7/2000 | Fushimi | |
| 6,091,699 A | 7/2000 | Nakane | |
| 6,172,961 B1 | 1/2001 | Tanoue | |
| 6,195,320 B1 | 2/2001 | Furumiya | |
| 6,215,759 B1 | 4/2001 | Tanoue | |
| 6,233,207 B1 | 5/2001 | Tanaka | |
| 6,259,658 B1 | 7/2001 | Tanoue | |
| 6,298,033 B1 | 10/2001 | Tanoue | |
| 6,333,902 B1 | 12/2001 | Shim | |
| 6,459,667 B1 | 10/2002 | Iijima et al. | |
| 6,747,932 B1 * | 6/2004 | Jeon ........................... | 369/53.24 |
| 7,433,283 B2 | 10/2008 | Wu | |

(Continued)

FOREIGN PATENT DOCUMENTS

EP    1 329 883 A1    7/2003

(Continued)

*Primary Examiner* — Lixi Chow
(74) *Attorney, Agent, or Firm* — Winston Hsu; Scott Margo (57) ABSTRACT

Disclosed is a system for generating an output signal indicating a specific area on an optical disc. The system includes an optical pick-up head signal generator, a detecting apparatus, and an output signal generating apparatus. The optical pick-up head signal generator is used for generating an optical pick-up head signal. The detecting apparatus is used for detecting pre-recorded address information on the optical disc to generate a detection signal. Also, a output signal generating apparatus, which is coupled to the optical pick-up head signal generator and the detecting apparatus, is used for receiving the optical pick-up head signal and the detection signal to generate the output signal according to at least one of the optical pick-up head signal and the detection signal, the output signal generating apparatus not generating the output signal according to the optical pick-up head signal after a predetermined time.

9 Claims, 8 Drawing Sheets

U.S. PATENT DOCUMENTS

| | | | |
|---|---|---|---|
| 2003/0058757 A1* | 3/2003 | Miyagawa et al. | 369/44.25 |
| 2003/0147338 A1 | 8/2003 | Yoshikawa | |
| 2005/0002298 A1* | 1/2005 | Hou | 369/47.22 |
| 2005/0120261 A1* | 6/2005 | Lin et al. | 714/5 |
| 2005/0157603 A1* | 7/2005 | Tseng et al. | 369/30.14 |
| 2007/0171799 A1 | 7/2007 | Wu | |

FOREIGN PATENT DOCUMENTS

| | | |
|---|---|---|
| JP | 10198978 | 7/1998 |
| JP | 1130834 | 2/1999 |
| TW | 374898 | 11/1999 |
| TW | 200539117 | 12/2005 |

* cited by examiner

| Header | | | Recording field | | | | | |
|---|---|---|---|---|---|---|---|---|
| | Mirror | Gap | Guard 1 | VFO 3 | PS | Data | PA 3 | Guard 2 | Buffer |
| 128 | 2 | 10+I/16 | 20+k | 35 | 3 | 24/8 | 1 | 55-k | 25-J/16 |

SYSTEM AND METHOD FOR GENERATING AN OUTPUT SIGNAL INDICATING A SPECIFIC AREA ON AN OPTICAL DISC UTILIZING AN ADJUSTABLE SPECIFIC TIME

BACKGROUND

The present disclosure relates to a system and method for generating an output signal indicating a specific area on an optical disc, and more particularly, to a system and method for generating an output signal indicating a specific area on an optical disc utilizing an adjustable specific time.

Figure 1:
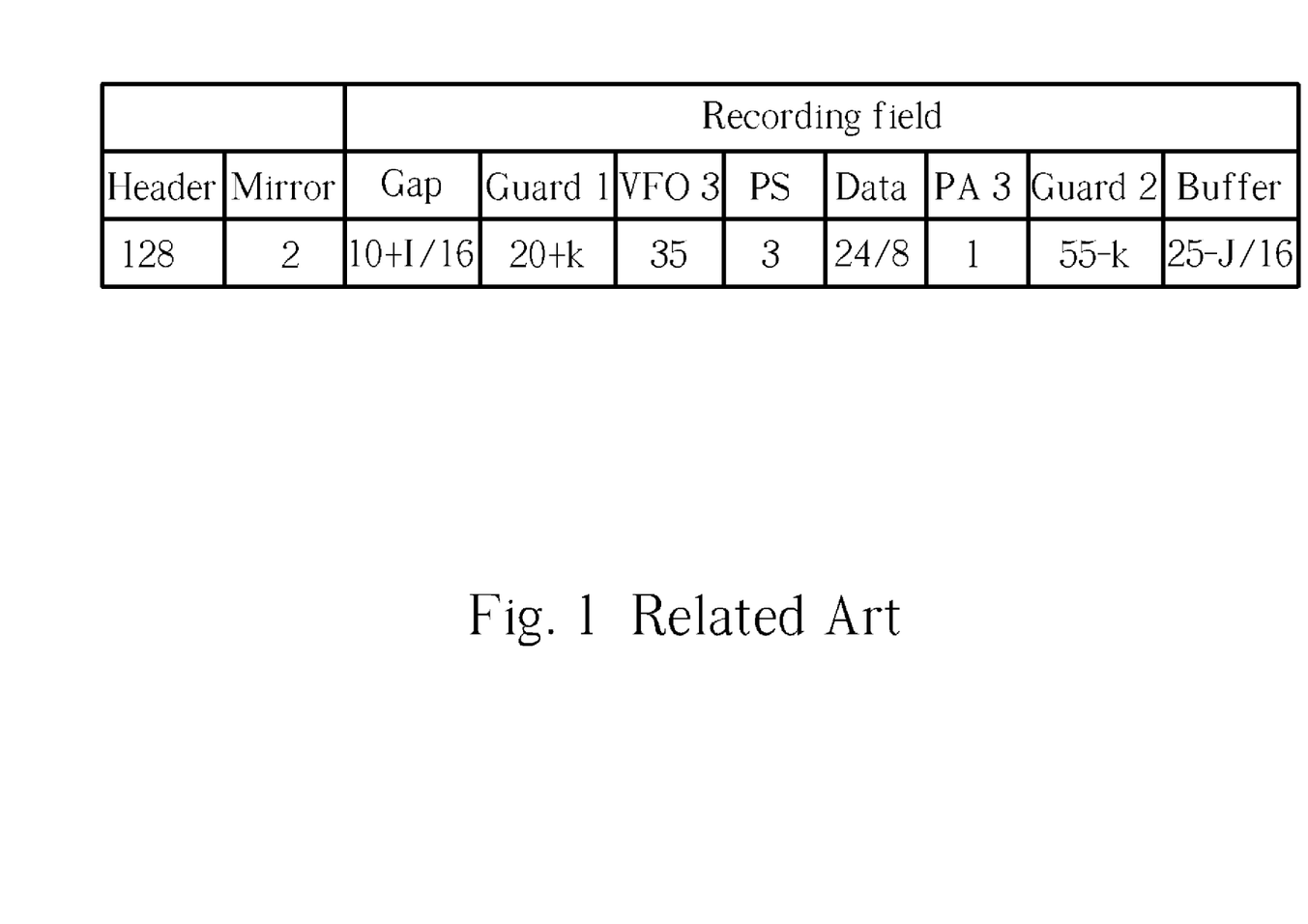
FIG. 1 is a diagram illustrating a related art DVD data field.

An optical disc with pre-recorded address information (e.g., a DVD-RAM disc) includes different kinds of areas, as shown in FIG. 1, and which area is to be processed should be determined accurately while reading data from a target area or recording data onto the target area. Since the data field configuration is clearly defined in the DVD-RAM specification, further description is omitted here for the sake of brevity. As known to those skilled in this art, many operations should be performed before processing the target area, such as slicer reset, PLL adjusting, etc. When the target area to be processed can be determined as early as possible, the aforementioned operations can be performed more accurately, thereby increasing the accuracy of data reading or data recording.

Traditionally, two steps are necessary for generating desired output signals indicating specific areas of an optical disc with pre-recorded address information. One is utilizing an optical pick-up head signal and the other is utilizing pre-recorded address information commonly called Physic identification (PID) for a DVD-RAM disc. Because the pre-recorded address information cannot be obtained initially, the optical pick-up head signal is first utilized to generate output signals indicating specific areas of an optical disc, and then the pre-recorded address information is utilized.

However, optical pick-up head signals are usually unstable, meaning that the generation of pre-recorded address information may be affected due to undesired errors. Consequently, the output signals indicating specific areas of the optical disc according to the header signals and pre-recorded address information become unreliable thereby degrading the performance of the optical disc drive.

Figure 2:
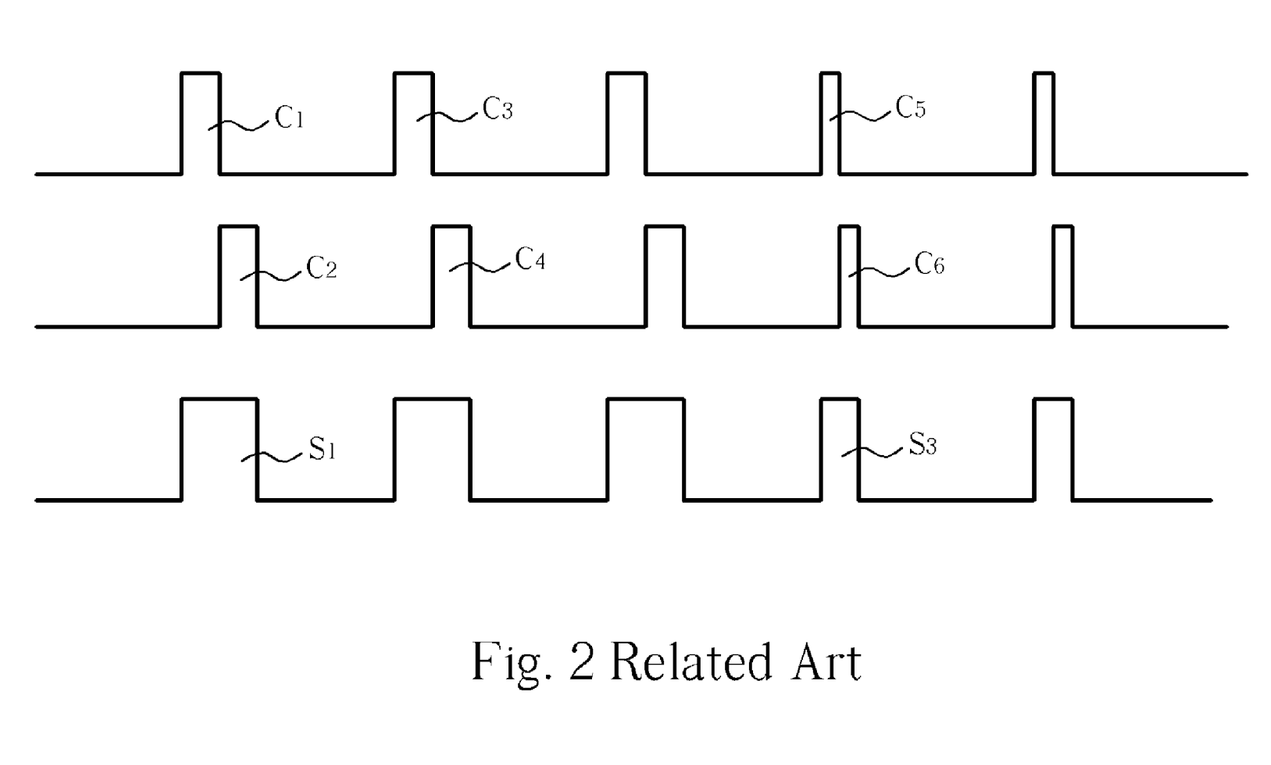
FIG. 2 is a schematic diagram illustrating the error due to the wrong optical pick-up head signals.
Figure 3:
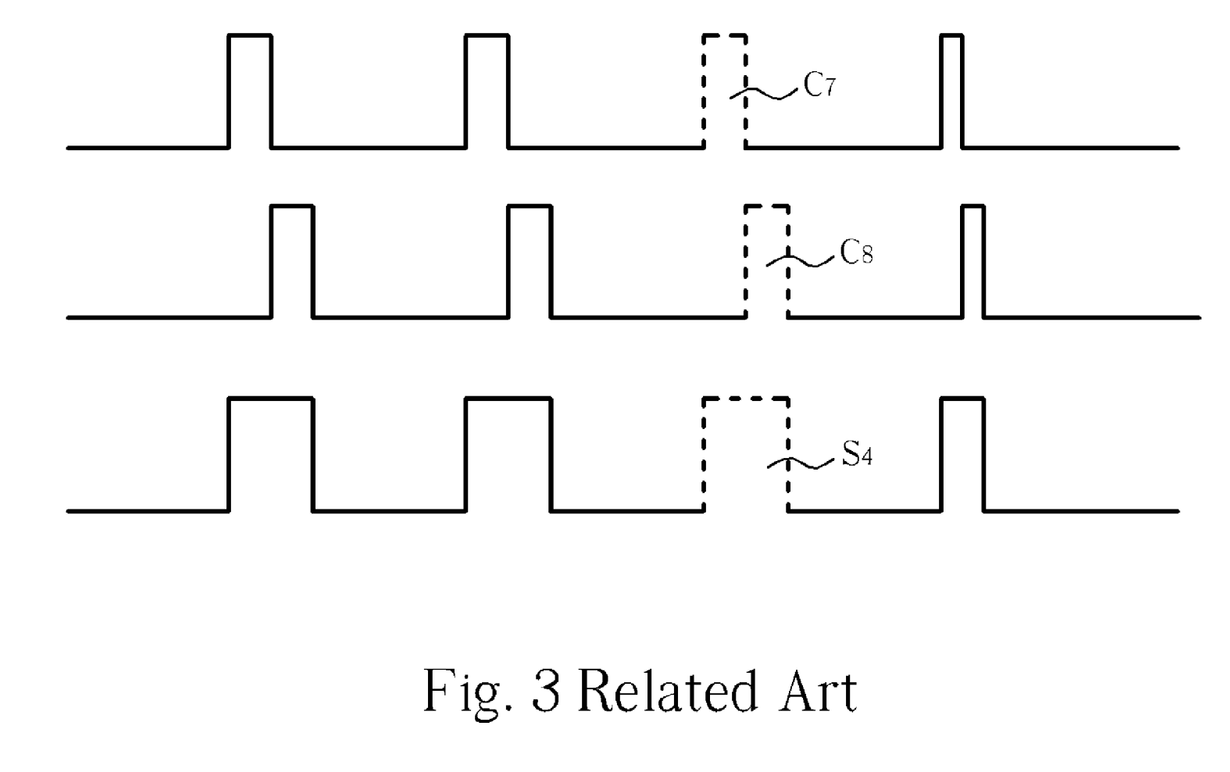
FIG. 3 is a schematic diagram illustrating the error due to the erroneous optical pick-up head signals.

FIG. 2 and FIG. 3 are schematic diagrams illustrating the error due to erroneous optical pick-up head signals. As shown in FIG. 2, the correct output signal $S_1$ is generated from the correct optical pick-up head signals $C_1$ and $C_2$, and the correct output signal $S_2$ is generated from the correct optical pick-up head signals $C_3$ and $C_4$. However, if the erroneous optical pick-up head signals $C_5$ and $C_6$ occur, the erroneous output signal $S_3$ is also generated from the wrong optical pick-up head signals $C_5$ and $C_6$. Similarly, as shown in FIG. 3, the optical pick-up head signals $C_7$ and $C_8$ that should be generated are not generated, and the corresponding output signal that should be generated is not generated, either. In the case described above, generation of the erroneous output signals may result in serious problems.

Therefore, a new method is needed to solve these problems.

SUMMARY

Therefore, one objective of the present disclosure is to solve the problems due to the erroneous optical pick-up head signals by generating an output signal indicating a specific area on an optical disc utilizing an adjustable specific time.

According to the claimed disclosure, a system for generating an output signal indicating a specific area on an optical disc is disclosed. The system comprises an optical pick-up head signal generator, a detecting apparatus, and an output signal generating apparatus. The optical pick-up head signal generator is used for generating an optical pick-up head signal. The detecting apparatus is used for detecting pre-recorded address information on the optical disc to generate a detection signal. Also, an output signal generating apparatus, which is coupled to the optical pick-up head signal generator and the detecting apparatus, is used for receiving the optical pick-up head signal and the detection signal to generate the output signal according to at least one of the optical pick-up head signal and the detection signal, the output signal generating apparatus not generating the output signal according to the optical pick-up head signal after a predetermined time.

Additionally, according to the claimed disclosure, another system for generating an output signal indicating a specific area on an optical disc is disclosed. The system comprises: an optical pick-up head signal generator, a first output signal generator, a detecting apparatus, a second output signal generator, and a selecting apparatus. The optical pick-up head signal generator is used for generating an optical pick-up head signal. The first output signal generator, which is coupled to the optical pick-up head signal generator, is used for generating a first output signal according the optical pick-up head signal. The detecting apparatus is used for detecting pre-recorded address information on the optical disc to generate a detection signal. The second output signal generator, which is coupled to the detecting apparatus, is used for generating a second output signal according the detection signal; and the selecting apparatus, which is coupled to the first output signal generator and the second output signal generator, is used for selecting at least one of the first output signal and the second output signal as the desired output signal, wherein the selecting apparatus does not select the first output signal as the desired output signal after a predetermined time.

According the claimed disclosure, a method for generating an output signal indicating a specific area on an optical disc is disclosed. The method comprises: (a) generating an optical pick-up head signal; (b) detecting pre-recorded address information on the optical disc to generate a detection signal; (c) generating the output signal according to at least one of the optical pick-up head signal and the detection signal; and (d) generating the output signal according to the optical pick-up head signal after a predetermined time.

According the claimed disclosure, a method for generating an output signal indicating a specific area on an optical disc is disclosed. The method comprises: (a) generating an optical pick-up head signal; (b) generating a first output signal according the optical pick-up head signal; (c) detecting pre-recorded address information on the optical disc to generate a detection signal; (d) generating a second output signal according the detection signal; and (e) selecting at least one of the first output signal and the second output signal as the desired output signal; and (f) selecting the first output signal as the desired output signal after a predetermined time.

These and other objectives of the present disclosure will no doubt become obvious to those of ordinary skill in the art after reading the following detailed description of the preferred embodiment that is illustrated in the various figures and drawings.

DETAILED DESCRIPTION

Figure 4:
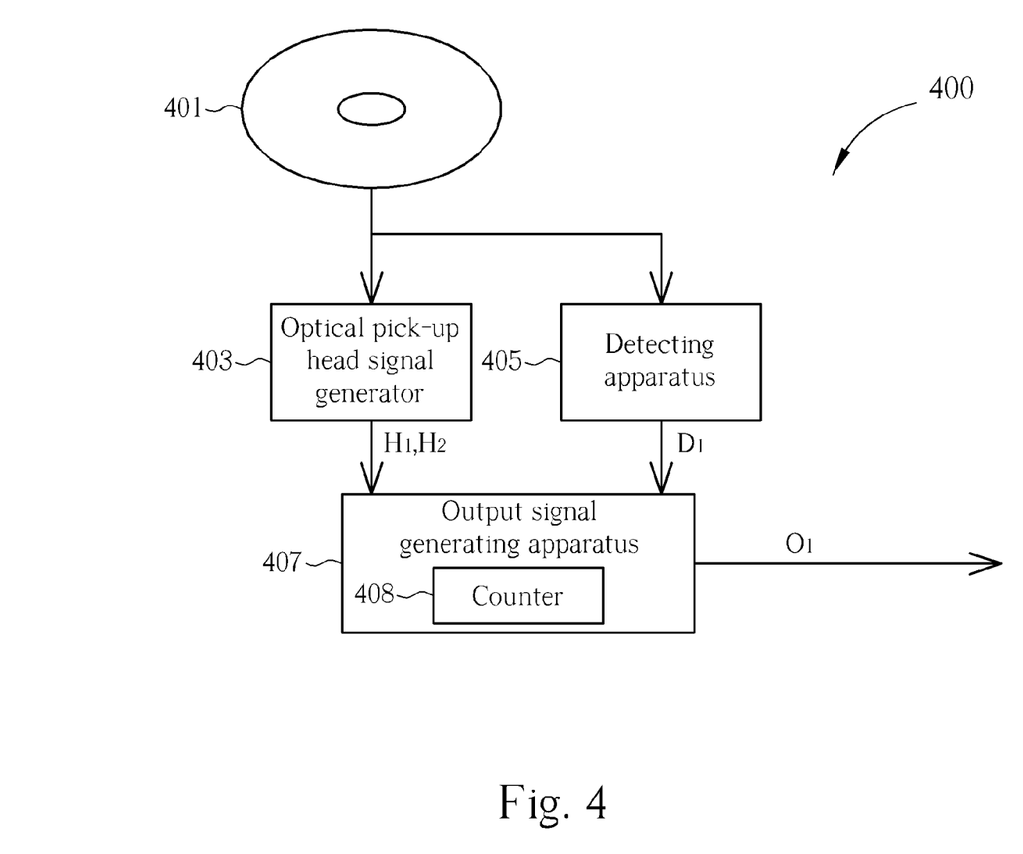
FIG. 4 is a block diagram illustrating a system for generating an output signal indicating a specific area on an optical disc according to a first embodiment of the present disclosure.

FIG. 4 is a block diagram illustrating a system 400 for generating an output signal indicating a specific area on an optical disc 401 according to a first embodiment of the present disclosure. As shown in FIG. 4, the system 400 comprises the optical disc 401, an optical pick-up head signal generator 403, a detecting apparatus 405, and an output signal generating apparatus 407. Please note that only the components relevant to the present invention are shown in FIG. 4. For example, the optical pick-up head is not illustrated. The optical pick-up head signal generator 403 is used for generating optical pick-up head signals $H_1$ and $H_2$, and the detecting apparatus 405 is used for detecting pre-recorded address information on the optical disc 401 to generate a detection signal $D_1$. Additionally, the output signal generating apparatus 407, coupled to the optical pick-up head signal generator 403 and the detecting apparatus 405, is used for receiving the optical pick-up head signal $H_1$, H2 and the detection signal $D_1$ to generate the output signal $O_1$ used for indicating a specific area of the optical disc 401 according to at least one of the optical pick-up head signal $H_1$, $H_2$ and the detection signal $D_1$, where the output signal generating apparatus 407, in this embodiment, does not generate the output signal $O_1$ according to the optical pick-up head signals H1, H2 after a predetermined time.

Figure 5:
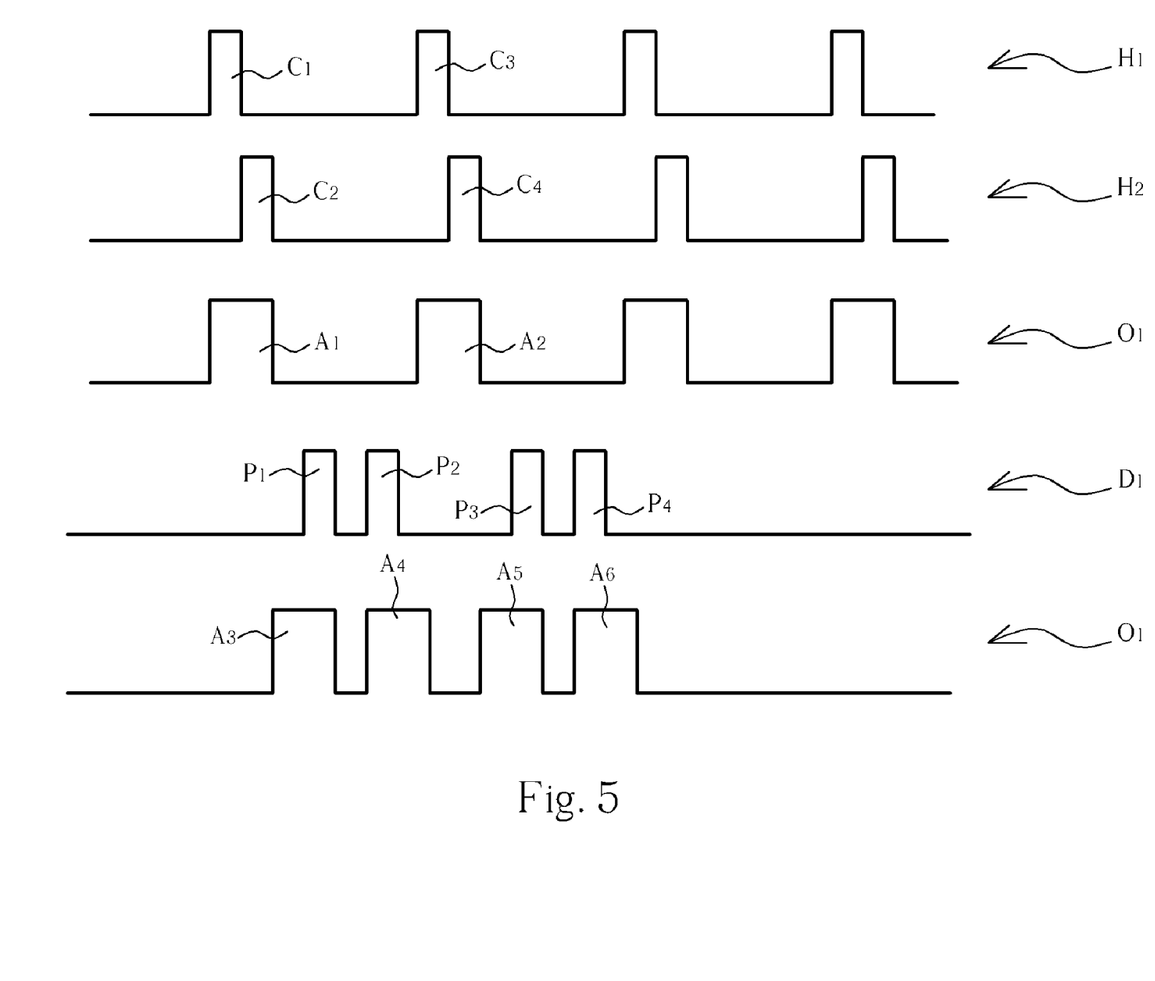
FIG. 5 is a schematic diagram illustrating the operation of the system shown in FIG. 4.

FIG. 5 is a schematic diagram illustrating the operation of the system 400 shown in FIG. 4. As shown in FIG. 5, initially the regions $A_1$ and $A_2$ of the output signal $O_1$ are generated according to the high level regions $C_1$, $C_2$, $C_3$ and $C_4$ Of the optical pick-up head signals $H_1$ and $H_2$, wherein the regions $A_1$ and $A_2$ indicate specific areas of the optical disc 401. Also, after a predetermined time T, the regions $A_3$-$A_6$ indicating specific areas of the optical disc 401 are generated according to the regions $P_1$-$P_4$ of the detecting signal $D_1$, wherein the regions $P_1$-$P_4$ indicate specific pre-recorded address. For DVD-RAM discs, the regions $P_1$-$P_4$ are physical identification (PID). By this way, the problems caused by the erroneous output signals generated from erroneous optical pick-up head signals can be avoided.

It should be noted that, to achieve the results shown in FIG. 5, the optical pick-up head signal generator 403 and the detecting apparatus 405 are initially turned on and the optical pick-up head signal generator 403 is turned off after the predetermined time T. In an alternative design of the present disclosure, the optical pick-up head signal generator 403 is initially turned on and the detecting apparatus 405 is initially turned off, and the optical pick-up head signal generator 403 is turned off and the detecting apparatus 405 is turned on after the predetermined time T.

Moreover, the predetermined time T is set by a fixed value, a value selected from a particular range, or a value calculated by a specific function. In this embodiment, the specific function determines the value set to the predetermined time T according to a track seeking distance and a rotation speed of the optical disc. In other words, the convergence time of a PLL circuit (not shown) of the system 400 is determined according to the track seeking distance and the rotation speed, and the predetermined time T is determined according to the convergence time of the PLL circuit. In this case, the convergence time means the time required by the PLL circuit to lock a generated clock signal to a specific frequency.

The output signal generating apparatus 407 comprises a counter 408. The counter 408, coupled to the optical pick-up head signal generator 403 and the detecting apparatus 405, is used for generating a counter value and updating the counter value according to at least one of the optical pick-up head signals $H_1$, $H_2$ and the detection signal $D_1$. The counter 408 does not update the counter value according to the optical pick-up head signal $H_1$, $H_2$ after the predetermined time T. The output signal generating apparatus 407 references the counter value to generate the output signal $O_1$. The operation for generating output signals of the disc using the counter value is well known to persons skilled in the art, thus detailed description is omitted here for the sake of brevity.

Figure 6:
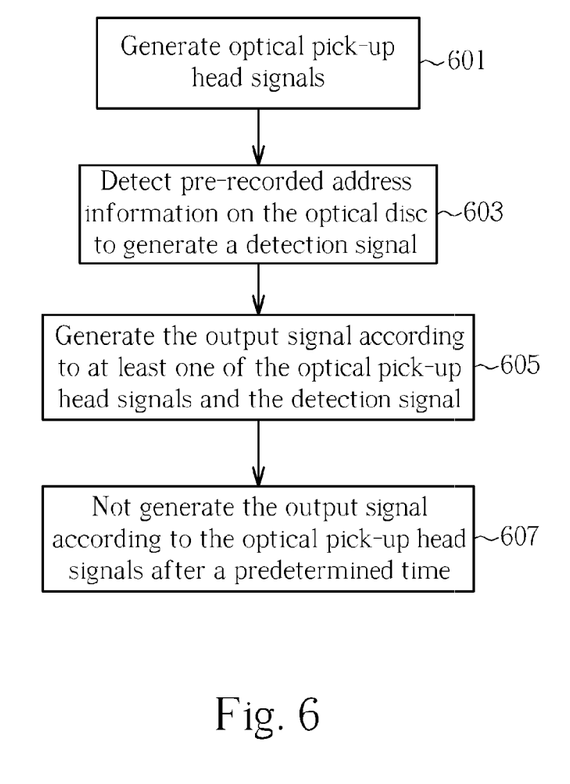
FIG. 6 is a flow chart illustrating a method performed by the system shown in FIG. 4.

FIG. 6 is a flow chart illustrating a method performed by the system 400 shown in FIG. 4. The method includes: generating optical pick-up head signals $H_1$ and $H_2$ (step 601); detecting pre-recorded address information on the optical disc to generate a detection signal $D_1$ (step 603); generating the output signal $O_1$ according to at least one of the optical pick-up head signal $H_1$, $H_2$ and the detection signal $D_1$ (step 605); not generating the output signal $O_1$ according to the optical pick-up head signal $H_1$ and $H_2$ after a predetermined time T (step 607).

Also, as mentioned above, the counter 408 is implemented in the output signal generating apparatus 407. Therefore, as to generation of the output signal $O_1$, step 605 further includes generating a counter value and updating the counter value according to at least one of the optical pick-up head signals and the detection signal, and step 607 further includes not updating the counter value according to the optical header signal after the predetermined time T.

Figure 7:
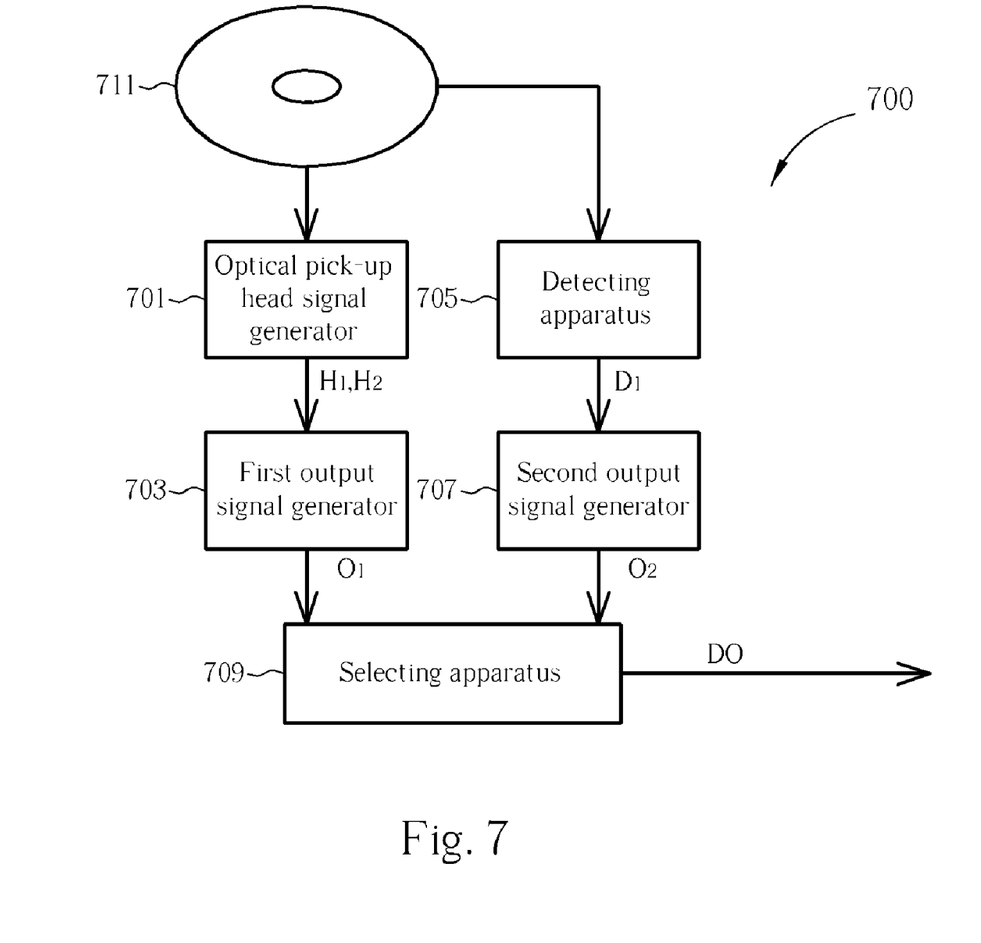
FIG. 7 is a block diagram illustrating a system for generating an output signal indicating a specific area on an optical disc according to a second embodiment of the present disclosure.

FIG. 7 is a block diagram illustrating a system 700 for generating an output signal indicating a specific area on an optical disc according to a second embodiment of the present invention. As shown in FIG. 7, the system 700 includes an optical pick-up head signal generator 701, a first output signal generator 703, a detecting apparatus 705, a second output signal generator 707, a selecting apparatus 709 and an optical disc 711. Please note that only the components relevant to the present invention are shown in FIG. 7. For example, the optical pick-up head is not illustrated. The optical pick-up head signal generator 701 is used for generating optical pick-up head signals $H_1$ and $H_2$. Also, the first output signal generator 703, coupled to the optical pick-up head signal generator 701, is used for generating a first output signal $O_1$ according the optical pick-up head signals $H_1$ and $H_2$. Also, the detecting apparatus 705 is used for detecting pre-recorded address information on the optical disc 711 to generate a detection signal $D_1$. Additionally, the second output signal generator 707, coupled to the detecting apparatus 705, is used for generating a second output signal $O_2$ according the detection signal $D_1$. The selecting apparatus 709, coupled to the first output signal generator 703 and the second output signal generator 707, is used for selecting at least one of the first output signal $O_1$ and the second output signal $O_2$ as the desired output signal DO, wherein the selecting apparatus 709 does not select the first output signal $O_1$ as the desired output signal DO after a predetermined time T. In this case, the first output signal generator and the second output generator are counters. However, persons skilled in the art can easily use any other devices to reach the function of the first output signal generator and the second output generator.

Similar to the aforementioned first embodiment, the predetermined time T of the second embodiment is set by a fixed value, a value selected from a particular range, or a value calculated by a specific function. In this embodiment, the specific function determines the value according to a track seeking distance and a rotation speed of the optical disc. In other words, the convergence time of a PLL circuit (not shown) of the system 700 is determined according to the track seeking distance and the rotation speed, and the predetermined time T is determined according to the convergence time of the PLL circuit. In this case, the convergence time means the time required by the PLL circuit to lock a generated clock signal to a specific frequency.

Figure 8:
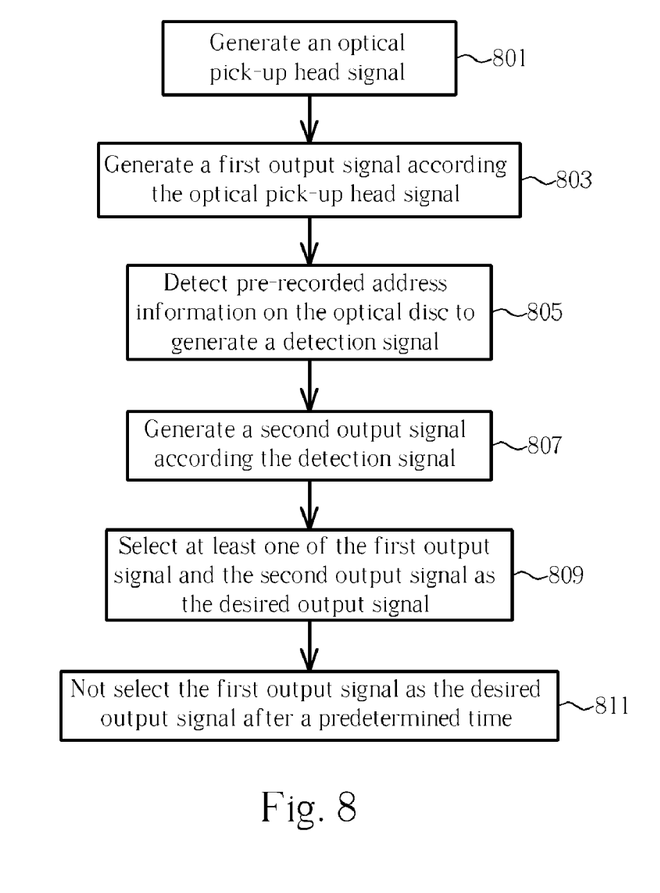
FIG. 8 is a flow chart illustrating a method performed by the system shown in FIG. 7.

FIG. 8 is a flow chart illustrating a method performed by the system 700 shown in FIG. 7. As shown in FIG. 8, the method includes: generating optical pick-up head signal $H_1$, $H_2$ (step 801); generating a first output signal $O_1$ according the optical pick-up head signals $H_1$, $H_2$ (step 803); detecting pre-recorded address information on the optical disc to generate a detection signal $D_1$ (Step 805); generating a second output signal $O_2$ according the detection signal $D_1$ (step 807); selecting at least one of the first output signal $O_1$ and the second output signal $O_2$ as the desired output signal (step 809); and not selecting the first output signal $O_1$ as the desired output signal after a predetermined time (Step 811).

Similar to the first embodiment, though in FIG. 7 and FIG. 8 the output signal $O_1$ is generated from two optical pick-up head signals $H_1$, $H_2$, it does not mean that the output signal $O_1$ can be generated only according two optical pick-up head signals. The output signal can be generated using other numbers of optical pick-up head signals.

It should be noted, in the above embodiments the output signal $O_1$ is generated according to two optical pick-up head signals $H_1$, $H_2$, it does not mean that the output signal $O_1$ can be generated only according two optical pick-up head signals. The output signal can be generated using other numbers of optical pick-up head signals.

As described above, by not generating output signals from optical pick-up head signals after a predetermined time, improved data reliability is obtained.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method for generating an output signal for indicating a specific area on an optical disc, comprising:
   (a) generating an optical pick-up head signal;
   (b) detecting pre-recorded address information on the optical disc to generate a detection signal;
   (c) generating the output signal according to at least one of the optical pick-up head signal and the detection signal before a predetermined time; and
   (d) generating the output signal according to the detection signal detected after the predetermined time.

2. The method of claim 1, wherein the predetermined time is set by a fixed value, a value selected from a particular range, or a value calculated by a specific function.

3. The method of claim 2, wherein the specific function determines the value according to a tracking seeking distance and a rotation speed of the optical disc.

4. The method of claim 1, further comprising:
   (e) generating a counter value and updating the counter value according to at least one of the optical pick-up head signal and the detection signal; and
   (f) updating the counter value according to the detection signal after the predetermined time,
   wherein the step (c) generates the output signal according to the counter value.

5. A system for generating an output signal for indicating a specific area on an optical disc, comprising:
   an optical pick-up head signal generator, for generating an optical pick-up head signal;
   a detecting apparatus, for detecting pre-recorded address information on the optical disc to generate a detection signal; and
   an output signal generating apparatus, coupled to the optical pick-up head signal generator and the detecting apparatus, for receiving the optical pick-up head signal and the detection signal to generate the output signal according to at least one of the optical pick-up head signal and the detection signal before a predetermined time, and generating the output signal according to the detection signal detected after the predetermined time.

6. The system of claim 5, wherein the optical pick-up head signal generator is initially turned on and the detecting apparatus is initially turned off, and the optical pick-up head signal generator is turned off and the detecting apparatus is turned on after the predetermined time.

7. The system of claim 5, wherein the predetermined time is set by a fixed value, a value selected from a particular range, or a value calculated by a specific function.

8. The system of claim 7, wherein the specific function determines the value according to a tracking seeking distance and a rotation speed of the optical disc.

9. The system of claim 5, wherein the output signal generator comprises:
   a counter, coupled to the optical pick-up head signal generator and the detecting apparatus, for generating a counter value and updates the counter value according to at least one of the optical pick-up head signal and the detection signal, the counter updating the counter value according to the detection signal after the predetermined time,
   wherein the output signal generating apparatus is coupled to the counter, for generating the output signal according to the counter value.

* * * * *